United States Patent [19]

Moseley et al.

[11] Patent Number: 4,507,855
[45] Date of Patent: Apr. 2, 1985

[54] LEAD ACID ELECTRIC STORAGE CELL AND A POSITIVE ELECTRODE THEREFOR

[75] Inventors: Patrick T. Moseley, Chilton; Nevill J. Bridger, Hermitage, both of England

[73] Assignee: United Kingdom Atomic Energy Authority, London, England

[21] Appl. No.: 477,776

[22] Filed: Mar. 22, 1983

[30] Foreign Application Priority Data

Aug. 6, 1982 [GB] United Kingdom ................ 8222739
Dec. 20, 1982 [GB] United Kingdom ................ 8236203

[51] Int. Cl.³ .......................................... H01M 10/12
[52] U.S. Cl. .................................. 29/623.1; 429/228
[58] Field of Search ............... 429/225, 228, 217, 232; 423/619; 29/623.1, 623.5

[56] References Cited

U.S. PATENT DOCUMENTS

| | | | |
|---|---|---|---|
| 266,115 | 10/1882 | Eaton | 429/225 X |
| 273,492 | 3/1883 | Edison | 429/225 |
| 2,505,876 | 5/1950 | Baker | 429/225 X |
| 3,033,908 | 5/1962 | Darland, Jr. | 423/619 X |
| 4,110,519 | 8/1978 | Nilsson | 429/217 |
| 4,215,189 | 7/1980 | Bergum et al. | 429/217 |

FOREIGN PATENT DOCUMENTS

| | | |
|---|---|---|
| 45-8087 | 3/1970 | Japan . |
| 45-40164 | 12/1970 | Japan . |
| 51-5298 | 1/1976 | Japan . |
| 1476550 | 6/1977 | United Kingdom . |
| 2023558A | 1/1980 | United Kingdom . |

OTHER PUBLICATIONS

Hill, Roderick J., "The crystal structures of lead dioxides from the positive plate of the lead/acid battery", Materials Research Bulletin, pp. 769-783, vol. 17, No. 6, Pub. by Pergamon Press, 1982.

Primary Examiner—Anthony Skapars
Attorney, Agent, or Firm—Larson and Taylor

[57] ABSTRACT

A positive electrode for a lead acid electric storage cell is made by chemically preparing beta lead dioxide. The beta lead dioxide is then applied to a support structure with a binder, or poured into a permeable, tubular container located about a current collecting rod. The negative electrode can be made by compacting fine lead metal about a carrier, and the fine lead metal might comprise lead wool or particulate lead metal.

17 Claims, 3 Drawing Figures

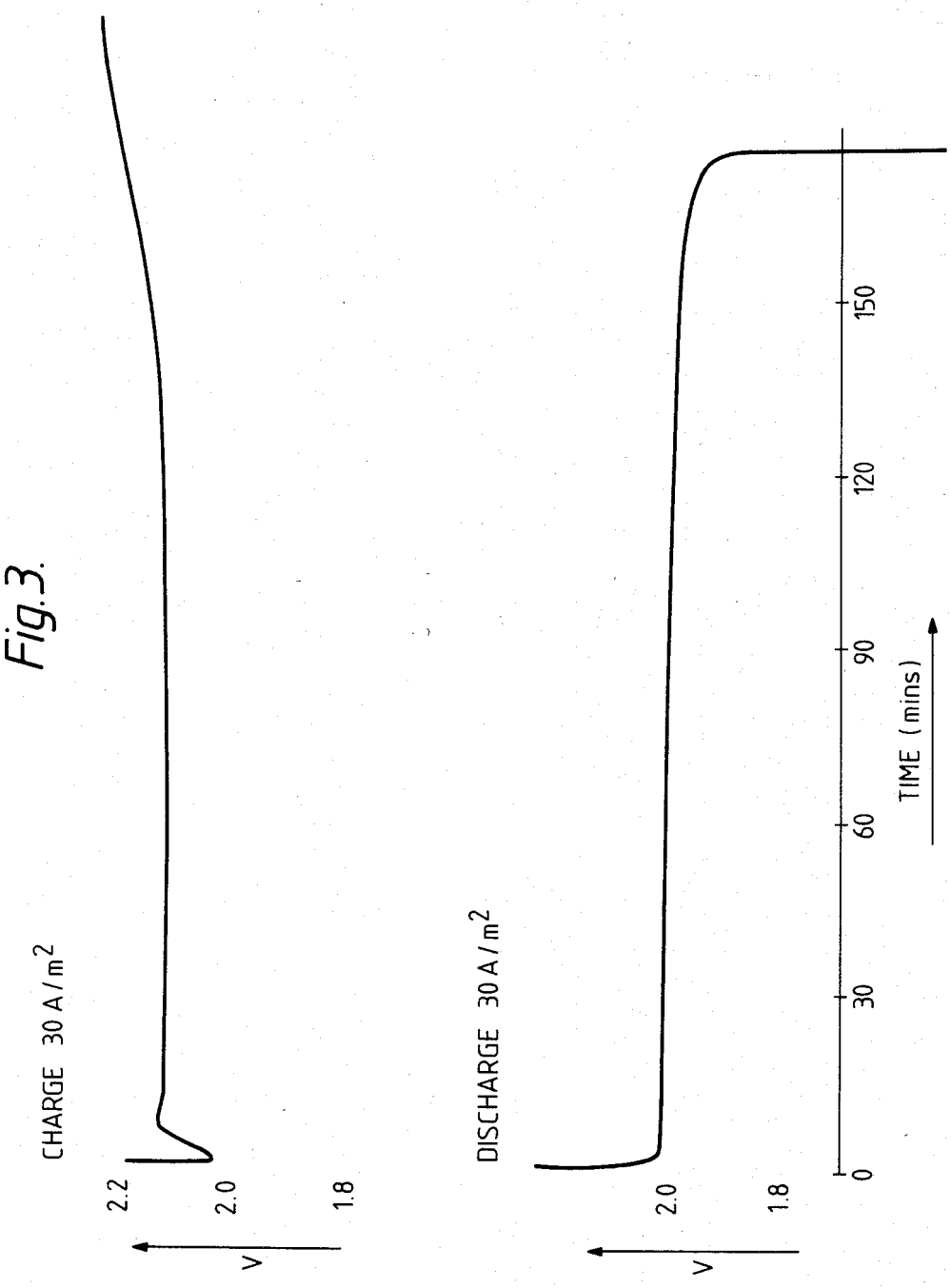

LEAD ACID ELECTRIC STORAGE CELL AND A POSITIVE ELECTRODE THEREFOR

BACKGROUND OF THE INVENTION

This invention relates to a lead acid electric storage cell, and includes a method of manufacturing a positive electrode therefor.

In a well known method of manufacturing a positive electrode for a lead acid electric storage cell, lead monoxide is mixed with water and sulphuric acid to form an active mass which is then pressed into a lead grid. The grid with the active mass is subsequently held in an environment of controlled humidity for 2-3 days—the "curing" process, and then subjected to a low charging current for a further 2-3 days to convert the active mass electrochemically to lead dioxide—the "formation" process. This known method is time consuming and relatively costly, and thus the invention is concerned with providing an alternative, much shorter method of manufacturing the positive electrode.

FEATURES AND ASPECTS OF THE INVENTION

According to the present invention, a method of manufacturing a positive electrode for a lead acid electric storage cell comprises, chemically preparing particulate material comprising beta lead dioxide, and supporting the beta lead dioxide with a carrier therefor adapted to be located in the cell.

The carrier may comprise a permeable, electrically insulating, tubular container for the beta lead dioxide, into which container a current collecting means extends. Alternatively, the carrier may comprise an electrically conductive support structure.

Preferably, the beta lead dioxide is manufactured by reacting red lead with nitric acid in the range 3M to 6M at a temperature between 80° C. and 100° C.

The method may include mixing with the beta lead dioxide a particulate, electrically conductive material inert to the electrochemical reactions inside the cell. In some applications of the invention the beta lead dioxide may be mixed with a binder therefor, the binder preferably comprising polytetrafluoroethylene (hereinafter referred to as "PTFE") but desirably not exceeding 20% by weight of the mixture. However, the proportion of beta lead dioxide in the mixture is desirably at least 50% by weight.

The positive electrode may with some advantage be subjected to an initial relatively short electric charge, to improve the electrical capacity of the positive electrode.

It will be understood that the invention includes a positive electrode made by the method of the invention, and also includes a lead acid electric storage cell incorporating said positive electrode. Advantageously, the lead acid electric storage cell includes a negative electrode manufactured by compacting fine lead metal about a carrier therefor.

It will be seen from the foregoing, that the invention rather surprisingly dispenses with the known electrochemical route for the preparation of lead dioxide, and relies on the chemical preparation of beta lead dioxide. This choice is counter to the practice of the lead acid battery art, since this art accepts that chemically produced lead dioxide is electrochemically inert. See for example:

(1) Materials Science and Engineering, 28 (1977) pp 167-199, particularly page 187, "Materials and Mechanisms determining performance of Lead-Acid Storage Batteries", by Jeff Perkins, copyright, Elsevier Sequoia SA. Lausanne.

(2) Paper entitled "Different Forms of Lead Dioxide" particularly page 3, by A. C. Simon and S. M. Caulder, presented at the ILZRO Battery Research Meeting, Germany, May 6, 1980.

(3) Journal of the Electrochemical Society Vol 120, No 11, November 1973, pp 1515-1516, particularly page 1516, article entitled "The Hydrogen-Loss Concept of Battery Failure: The $PbO_2$ Electrode", by S. M. Caulder, J. S. Murray, and A. C. Simon.

(4) Journal of the Electrochemical Society, Vol 122, No 4, April 1975, pp 461-466, particularly page 463, article entitled "Structural Tranformations of the $PbO_2$ Active Material during Cycling" by A. C. Simon, S. M. Caulder and J. T. Stemmle.

(5) Journal of Power Sources, 4 (1979) pp 203-213, particularly page 209, copyright, Elsevier Sequoia SA, Lausanne, "Conductivity Measurements on Pure and Mixed Metal Dioxides", by Jean Brenet and Peter Faber.

(6) Journal of Power Sources, 4, (1979) pp 183-190, particularly page 188, copyright, Elsevier Sequoia SA, Lausanne, "Electrochemical Behaviour of Metallic Oxides", by Jean Brenet.

However, notwithstanding the consistent practice of the art to the contrary, positive electrodes made by the method of the invention have been found to possess a significant initial discharge capacity.

BRIEF EXPLANATION OF THE DRAWINGS

The invention will be further described by way of example only with reference to the accompanying drawings, in which:

FIG. 3 shows a graphical representation of a charge/discharge cycle of the positive electrode of FIG. 1.

DETAILED DESCRIPTION

Figure 1:
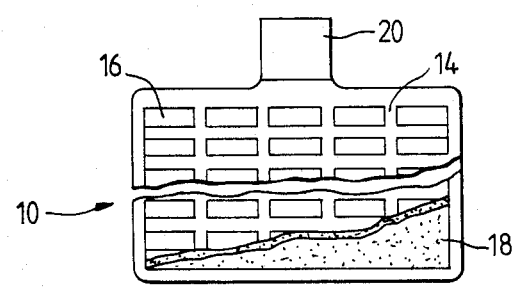
FIG. 1 shows a partly broken away side view of a representation of a positive electrode for a lead acid electric storage cell.
Figure 2:
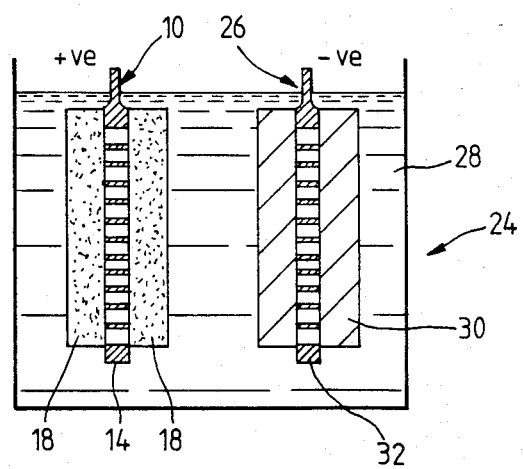
FIG. 2 shows a diagrammatic sectional representation of a lead acid electric storage cell including the positive electrode of FIG. 1.

Referring now to FIG. 1, a positive electrode 10 shown comprises, a conventional lead support grid 14 having a multiplicity of rectangular recesses 16 and to both sides of which (only one is shown in FIG. 1) active material 18 has been applied. A tab 20 of the support grid 14 provides a terminal for current collection when, as shown in FIG. 2, the positive electrode 10 is incorporated in an electric cell 24 having a lead negative electrode 26 and containing sulphuric acid as an electrolyte 28.

The active material 18 comprises beta lead dioxide mixed with PTFE as an inert binder. The active material 18 can be made on the lines suggested by Bagshaw, Clark and Halliwell J. Appl. Chem. (1966) 16, 180, by suspending red lead (60 grammes) in 5M nitric acid (300 ml) at a temperature of between about 80°-100° C., preferably about 95° C., for about 15 minutes the beta lead dioxide particulate product subsequently being filtered and washed with water. The beta lead dioxide is then mixed with an aqueous slurry of PTFE, for example ICI "FLUON" Grade GP1, and the mixture pressed about the sides of the support grid 14 to form the positive electrode 10. In some applications graphite powder, for example Hopkins & Williams No. 445000, might be mixed with the beta lead dioxide and PTFE.

Some results obtained using positive electrodes 10 of different compositions are shown in Table 1 below:

TABLE 1

| Composition (grammes) | | | Discharge Capacity |
|---|---|---|---|
| Beta Lead Dioxide | PTFE | Graphite | Percentage of Theoretical Capacity |
| 24 | 8 | 7 | 15 |
| 24 | 5 | 0 | 12 |
| 48 | 10 | 18 | 4 |

During subsequent cycling of about 40 deep discharge/charge cycles, the discharge capacities remained substantially constant, and the active material 18 adhered well to the support grid 14. A typical discharge/charge cycle for the positive electrode 10 is illustrated in FIG. 3 to which reference, may be made.

The affect on discharge capacity of varying the temperature of the nitric acid when forming the beta lead dioxide can be seen in Table 2 below:

TABLE 2

| Nitric Acid Strength (M) | Temperature of Nitric Acid | Time at Temperature (mins) | Discharge Capacity Percentage of Theoretical Capacity |
|---|---|---|---|
| 5 | 95 | 15 | 15 |
| 6 | 95 | 15 | 16 |
| 3 | 95 | 15 | 18 |
| 5 | 80 | 15 | 8 |
| 5 | 100 | 15 | 14 |

In each of the examples in Table 2, the active material 18 comprised 17 grammes chemically prepared beta lead dioxide, 7 grammes graphite powder, and 10 grammes PTFE. It can be observed that an optimum temperature is reached at about 95° C. In each example the grain size of the beta lead dioxide was of the order of 500 Å.

The proportion of the PTFE in the active material 18 may be varied without affecting the discharge capacity of the active material 18 to any significant extent, as shown in Table 3 below.

TABLE 3

| Percentage by weight PTFE | Percentage by weight graphite powder | Discharge Capacity Percentage of Theoretical Capacity |
|---|---|---|
| 0 | 19 | 19* |
| 2 | 20 | 19 |
| 3 | 20 | 12 |
| 5 | 20 | 9 |
| 10 | 20 | 13 |
| 20 | 20 | 15 |

*The active material 18 was shed from the support grid 14 after one complete cycle. However even a relatively low proportion (e.g. 0.2% by weight) of PTFE has been found sufficient to retain the active material 18 on the support grid 14 during cycling.

As an alternative to mixing the chemically prepared beta lead dioxide with the PTFE and the graphite powder to form an active mass 18 to be applied to a support grid 14, the beta lead dioxide may be used in the well known tubular plate (or Ironclad) lead acid electric storage battery—see for example, "Standard Handbook for Electrical Engineers", pp 24–3 and 4, 10th Edition, published by the McGraw-Hill Book Company, and incorporated by reference herein. In the tubular plate battery, a plurality of parallel lead alloy current collecting rods integral with a cross-piece project vertically downwards into respective permeable tubular containers filled with lead dioxide to form a positive electrode. The tubular containers are usually made from woven glass filaments, or from woven or sintered plastics material, such as Terylene polyester or PTFE. Thus the beta lead dioxide prepared by the method of the invention is poured into the annular space between the container wall and the current collecting rod in each tubular container.

The beta lead dioxide may be made by an alternative chemical route, for example:

Beta lead dioxide was prepared by the hydrolysis of lead tetra-acetate (100 grammes) in glacial acetic acid (1 liter) by one liter of water added over about 4 hours, beta lead dioxide precipitate thereby formed being subsequently washed with water and filtered.

Then 20 grammes of the beta lead dioxide precipitate, 6 grammes graphite powder, and 2.5 ml of an aqueous slurry of PTFE were mixed with 2.5 ml of water, to form an active mass 18 which was applied to a support grid 14 of a positive electrode 10. The positive electrode 10 subsequently yielded 0.75 Amp hour capacity (i.e. 16.7% of the Theoretical Capacity at 0.25 amps).

It has been observed that variations in the discharge capacity of the positive electrode may be influenced by differences in the microstructure of the active material 18, although subsequent heating of the beta lead dioxide at 200° C. does not appear to have any significant affect on discharge capacity.

The negative electrode 26 may comprise spongy lead 30, or may be made by compacting fine lead metal such as lead wool about a lead support grid 32. Alternatively, particulate lead might be compacted about the support grid 32.

A comparison made between the lead acid electric storage cell 24 provided with a conventional commercial negative electrode 26, and the electric cell 24 provided with a negative electrode 26 made by compacting fine lead metal, had the following results:

Positive electrode composition

Beta lead dioxide—60 grammes
Binder—PTFE~8 grammes
graphite powder—14 grammes

Negative electrode

Conventional commercial negative electrode

The electric cell 24 was discharged and yielded 670 mA hr (about 5% of the theoretical capacity).

This test was repeated with the negative electrode 26 being replaced by a negative electrode comprising compacted lead wool of the same weight as the lead in the commercial negative electrode. The electric cell 24 when discharged yielded 570 mA hr at a rate of 90 mA.

One advantage of the use together of the positive electrode 10 of the invention and of the negative electrode 26 made by compacting fine lead metal, is that it allows the electric cell 24 to be assembled directly in the charged state, so that the electric cell 24 could be ready for immediate use.

We claim:
1. A method of making a charged lead acid electric storage cell comprising the steps of
    (i) making a first electrode by chemically preparing particulate beta lead dioxide and supporting the beta lead dioxide with a carrier;

(ii) making a second electrode by compacting fine lead metal about a carrier therefor;

(iii) assembling a charged lead acid electric storage cell comprising a positive electrode constituted by said first electrode, a negative electrode constituted by said second electrode, and an electrolyte for the cell.

2. A method as claimed in claim 1, wherein, in step (i), the carrier comprises a permeable, electrically insulating tubular container for the beta lead dioxide, and into which container a current collecting means extends.

3. A method as claimed in claim 1, wherein, in step (i), the carrier comprises an electrically conductive support structure.

4. A method as claimed in claim 1, wherein, in step (i), the beta lead dioxide is mixed with a binder therefor.

5. A method as claimed in claim 4, wherein the binder comprises PTFE.

6. A method as claimed in claim 5, wherein the PTFE does not exceed more than 20% by weight of the mixture.

7. A method as claimed in claim 6, wherein the PTFE does not exceed 2% by weight of the mixture.

8. A method as claimed in claim 5, wherein the PTFE is in the form of an aqueous slurry thereof.

9. A method as claimed in claim 4, wherein the beta lead dioxide is mixed with a particulate, electrically conductive material inert to the electrochemical reactions inside the cell.

10. A method as claimed in claim 9, wherein the conductive material comprises graphite powder.

11. A method as claimed in claim 9, wherein the proportion of said beta lead dioxide is at least 50% by weight of the mixture.

12. A method as claimed in claim 1, wherein the beta lead dioxide is prepared by reacting red lead with nitric acid.

13. A method as claimed in claim 1, wherein the beta lead dioxide is prepared by reacting red lead with nitric acid in the range 3M to 6M at a temperature between 80° C. and 100° C.

14. A method as claimed in claim 1, wherein the beta lead dioxide is prepared by hydrolysing lead tetra-acetate in glacial acetic acid.

15. A method as claimed in claim 1, wherein the beta lead dioxide has a grain size of about 500 Å.

16. A cell as claimed in claim 1, wherein the fine lead metal comprises lead wool.

17. A cell as claimed in claim 1, wherein the fine lead metal comprises particulate lead.

* * * * *